(12) United States Patent
Huo et al.

(10) Patent No.: US 11,245,112 B2
(45) Date of Patent: Feb. 8, 2022

(54) PREPARATION METHOD OF ANT NEST LIKE POROUS SILICON FOR LITHIUM-ION BATTERY

(71) Applicant: Wuhan University of Science and Technology, Hubei (CN)

(72) Inventors: Kaifu Huo, Hubei (CN); Biao Gao, Hubei (CN); Weili An, Hubei (CN); Jijiang Fu, Hubei (CN); Xuming Zhang, Hubei (CN); Siguang Guo, Hubei (CN)

(73) Assignee: WUHAN UNIVERSITY OF SCIENCE AND TECHNOLOGY, Hubei (CN)

( * ) Notice: Subject to any disclaimer, the term of this patent is extended or adjusted under 35 U.S.C. 154(b) by 860 days.

(21) Appl. No.: 16/075,332

(22) PCT Filed: Jan. 8, 2018

(86) PCT No.: PCT/CN2018/071691
§ 371 (c)(1),
(2) Date: Aug. 3, 2018

(87) PCT Pub. No.: WO2018/205665
PCT Pub. Date: Nov. 15, 2018

(65) Prior Publication Data
US 2020/0287210 A1    Sep. 10, 2020

(30) Foreign Application Priority Data
May 9, 2017 (CN) .......................... 201710322917.7

(51) Int. Cl.
*H01M 4/38* (2006.01)
*C01B 33/021* (2006.01)
(Continued)

(52) U.S. Cl.
CPC .......... *H01M 4/386* (2013.01); *C01B 33/021* (2013.01); *H01M 10/0525* (2013.01);
(Continued)

(58) Field of Classification Search
CPC .............. C01P 2004/61; C01P 2004/03; C01P 2004/04; C01P 2004/02; C01P 2004/62;
(Continued)

(56) References Cited

FOREIGN PATENT DOCUMENTS

| CN | 104701491 A | 6/2015 |
|---|---|---|
| CN | 105047892 A | 11/2015 |

(Continued)

OTHER PUBLICATIONS

CN105845918—see machine translation, published Aug. 10, 2016.*

(Continued)

*Primary Examiner* — Smita S Patel
(74) *Attorney, Agent, or Firm* — Hamre, Schumann, Mueller & Larson, P.C.

(57) ABSTRACT

A preparation method of an ant nest like porous silicon for a lithium-ion battery comprises: (1) enabling a magnesium silicide raw material to react for 2-24 h in an ammonia gas or an atmosphere containing an ammonia gas at 600-900° C. to obtain a crude product containing porous silicon; and (2) subjecting the crude product containing porous silicon to an acid pickling treatment to obtain the ant nest like porous silicon. The preparation method has the advantages of simplicity and easiness. A large amount of porous silicon can be obtained by directly heating the magnesium silicide raw material in the ammonia gas or a mixed gas of the ammonia gas and an inert gas with a high yield.

7 Claims, 3 Drawing Sheets

(51) Int. Cl.
*H01M 10/0525* (2010.01)
*H01M 4/02* (2006.01)

(52) U.S. Cl.
CPC ...... *C01P 2002/72* (2013.01); *C01P 2004/02* (2013.01); *C01P 2004/03* (2013.01); *C01P 2004/04* (2013.01); *C01P 2004/61* (2013.01); *C01P 2004/62* (2013.01); *C01P 2006/10* (2013.01); *C01P 2006/11* (2013.01); *C01P 2006/12* (2013.01); *C01P 2006/40* (2013.01); *H01M 2004/021* (2013.01)

(58) Field of Classification Search
CPC ............ C01P 2004/021; C01P 2006/60; C01P 2006/11; C01P 2006/10; C01P 2006/12; C01P 2006/40; H01M 2004/021; H01M 2004/00; H01M 4/386; H01M 4/362; H01M 4/36; H01M 4/38; H01M 10/0525; H01M 10/52; C01B 33/021; C01B 33/037; C01B 33/00
See application file for complete search history.

(56) References Cited

FOREIGN PATENT DOCUMENTS

| | | |
|---|---|---|
| CN | 105347346 A | 2/2016 |
| CN | 105399100 A | 3/2016 |
| CN | 105845918 A | 8/2016 |
| CN | 107215874 A | 9/2017 |
| CN | 107539990 A | 1/2018 |

OTHER PUBLICATIONS

CN105347346—see machine translation, published Feb. 24, 2016.*
Wada et al., "Bulk-Nanoporous-Silicon Negative Electrode with Extremely High Cyclability for Lithium-Ion Batteries Prepared Using a Top-Down Process", NANO Letters, Publication Date Jul. 2, 2014, pp. 4505-4510, 6 pages.

* cited by examiner

PREPARATION METHOD OF ANT NEST LIKE POROUS SILICON FOR LITHIUM-ION BATTERY

BACKGROUND OF THE PRESENT INVENTION

Field of the Present Invention

The present invention belongs to the field of related components of the lithium-ion battery, and more particularly relates to a preparation method of ant nest like porous silicon for a lithium-ion battery.

Description of the Related Art

The theoretical lithium storage capacity of silicon (Si) is as high as 4200 mAh/g, which is 11 times of that of the commercially available graphite negative electrode. In addition, Si has a voltage platform slightly higher than that of graphite, does not easily cause lithium precipitation on the surface during charging and has a better safety performance than that of the carbon (graphite) negative electrode material. Thus, Si is expected to replace graphite as a negative electrode material for the next-generation high-energy lithium-ion battery. Compared with bulk Si materials, nano-Si can reduce the structure damage from the huge stress generated in extraction and insertion processes of lithium ions due to the limited expansion volume, which will improve the electrochemical cycling performance of Si anode materials. Furthermore, nano-Si can also shorten the lithium ion deintercalation depth and diffusion path, resulting in dynamic advantages.

At present, preparation methods of Si nanomaterials or nanoporous Si mainly include physical method and chemical method, in which the physical method mainly includes a crushing method, a mechanical alloying method, an evaporation condensation method and so on; and the chemical method mainly includes a vapor deposition method, a magnesiothermic reduction method, a wet chemical reduction aerosol method and so on. However, these methods for preparing porous Si materials not only need severe synthesis conditions, high cost and complex processes, but also cause serious pollution and involve many toxic substances which are harmful to humans. For example, Chinese Patent Publication No. CN104701491A entitled "Nanoporous Silicon Lithium-ion Battery Anode Material and Preparation Method and Application thereof" discloses that the Si substrate material is ball-milled and then placed in a liquid containing hydrofluoric acid and nitric acid for chemical etching to form nanoporous silicon. In this method, the hydrofluoric acid is highly corrosive and it is difficult to control the porous structure of nanoporous Si. For another example, Chinese Patent Publication No. CN105399100A entitled "Preparation Method of Nanoporous Silicon" discloses that porous Si is prepared by a dealloying method in which another component in the alloy is removed by physical dissolution or chemical etching. In this method, a metal chloride molten salt is used to dealloy the magnesium silicide, and the resulting porous Si is formed by accumulation of Si nanoparticles, resulting in the unstable overall structure. As anode material for a lithium-ion battery, the capacity of the porous Si obtained in this method will decrease dramatically due to its structural damage resulting from the volume expansion in the repeated cycling process, which restricts its application. In addition, the metal chloride molten salt may easily absorb water at high temperatures, has a strong corrosiveness and pollutes the atmosphere. There is another method for preparing porous Si by dealloying using magnesium silicide, in which magnesium atoms in the magnesium silicide is dissolved by using the melt of precious metal bismuth at high temperature and then the excess bismuth is etched by the nitric acid solution so as to obtain porous Si, as disclosed in the literature "Bulk Nanoporous Silicon Negative Electrode with Extremely High Cyclability for Lithium-Ion Batteries Prepared Using a Top-Down Process" (Nano Lett. 2014, 14, 4505-4510). In this method, expensive helium gas is required, the melt bismuth is also very expensive and the equipment in very expensive. Thus, this method cannot be used widely to prepare porous Si on a large scale.

SUMMARY OF THE PRESENT INVENTION

In view of the above-described problems, the present invention provides a preparation method of ant nest like porous silicon for a lithium-ion battery, in which by improving the overall process flow of the porous Si key preparation method as well as parameters and conditions of respective reaction steps, compared with the prior art, the preparation method has the advantage of simplicity and easiness, a large amount of porous micron Si can be obtained by directly heating the obtained magnesium silicide in ammonia (or a mixed gas of ammonia gas and inert gas), and the yield is high; the raw material of the method is cheap commercial Si or magnesium silicide, the obtained micron Si has an ant nest like porous structure and the morphology and pore structure are easily regulated; and the pore size can be also changed by controlling the concentration of the ammonia (generally, the higher the ammonia concentration, the larger the pore size; and the ammonia concentration may be 5-95 vol %), and the pore depth can be controlled by the reaction time and the reaction temperature (generally, the longer the reaction time and the higher the reaction temperature, the deeper the pore depth. The maximum reaction temperature cannot exceed 900° C., and maximum reaction time is less than 24 h for controlling energy consumption). The ant nest like porous structure is a continuous pore structure which provides internal expansion space and electrolyte infiltration channels for the lithiation process. Thus, the porous Si can decrease the expansion of the cell while improving the lithium storage performance of Si, and can be widely used in the field of the anode material in the high energy density lithium-ion battery.

In order to achieve the above objective, according to an aspect of the present invention, there is provided a preparation method of ant nest like porous Si for a lithium-ion battery, comprising:

(1) enabling a magnesium silicide raw material to react with ammonia gas for 2-24 h at 600-900° C. so as to obtain a crude product containing porous Si and magnesium nitride; the magnesium silicide raw material has a particle size of 0.2-10 μm; and (2) subjecting the crude product obtained in the step (1) to acid pickling so as to obtain ant nest like porous Si.

Preferably, in the step (1), the reaction equation is $3Mg_2Si + 4NH_3 \rightarrow 3Si + 2Mg_3N_2 + 6H_2$.

Preferably, in the step (1), the magnesium silicide raw material is prepared by the reaction of Si powder and magnesium powder in the protective atmosphere; the thermal reaction is carried out at 400-900° C. with a holding time of 1-12 h; and the mass ratio of the Si powder to the magnesium powder is 1:(1.8-3).

Preferably, in the step (1), the atmosphere containing ammonia gas is a mixed atmosphere of ammonia gas and protective gas, in which the volume fraction of the ammonia gas in the atmosphere containing ammonia gas is 5-95%; and the protective gas is an inert gas.

Preferably, in the step (1), the magnesium silicide raw material is ball-milled so that the magnesium silicide raw material has a particle size of 0.2-10 μm; and the ball milling treatment is carried out under the protection of an inert gas.

Preferably, in the step (2), the acid pickling treatment is carried out by hydrochloric acid pickling to remove magnesium nitride which is a reaction by-product in the crude product containing porous silicon obtained in the step (1); ammonia gas generated in the acid pickling treatment is collected and used for participating in the reaction the step (1); and magnesium salt generated in the acid pickling treatment can be recycled and used for preparing magnesium powder.

Preferably, the ant nest like porous Si obtained in the step (2) has a specific surface area of 30-56 $m^2/g$, a tap density of 0.77-0.85 $g/cm^3$ and a compacted density of 1.64-1.97 $g/cm^3$.

In general, compared with the prior art, the present invention has the following beneficial effects:

(1) raw materials are cheap, and ant nest like porous Si can be obtained by simple nitridation reaction with commercially available micron Si powder or micron magnesium silicide powder as the raw material, which provides a new method for preparing the porous structure by de-alloying (the adopted reaction synthesis principle: $3Mg_2Si+4NH_3 \rightarrow 3Si+2Mg3N_2+6H_2$);

(2) the method features simple and easy synthesis, high yield, high purity and large-scale production;

Specifically, in the present invention, porous Si is generated by reacting magnesium silicide with ammonia gas (the by-product of this reaction is magnesium nitride), in which various reaction conditions (such as reaction temperature and time, in particular the particle size of the magnesium silicide raw material) can control the size and morphology of porous silicon. Typically, magnesium silicide raw material with a particle size of 0.2-10 μm reacts with ammonia gas at 600-900° C. for 2-24 h to generate a crude product containing porous silicon. In addition, in the preparation process of the present invention, the reaction product can be recycled and reused. For example, the product magnesium nitride can react with hydrochloric acid to recycle and reuse the same amount of ammonia gas ($Mg3N_2+6HCl=3MgCl_2+2NH_3$), and magnesium powder required for the reaction can also be recycled from $MgCl_2$.

(3) the ant nest like micro-sized porous silicon obtained in this method has a large number of three-dimensionally penetrated nanopores in the Si particles and is composed of many interconnected Si nanoframeworks. The ant nest like porous Si has a continuous pore structure which is a novel porous Si nanostructure. Compared with the conventional micron particles formed by accumulation of Si tiny nanoparticles, the ant nest like porous silicon has a more stable structure, and compared with other nano-structures (such as nanoparticles and nanowires), the ant nest like porous Si has a higher tap density; and (4) the prepared ant nest like porous Si has the following advantages: the porous structure can not only facilitate the contact of the electrolyte, but also allow inward volume expansion in the lithium ion intercalation process, thereby slowing the outward expansion of the electrode material in the cell to make the electrode film thickness stable, greatly improving the safety of the LIBs. Besides, interconnected Si nanoframeworks can effectively prevent the pulverization of Si anode materials and avoid dramatical capacity fading. In addition, the high tap density of porous micro-sized Si can increase the volumetric energy density of the LIBs. Thus, this structure is more conducive to meeting the requirements of large capacity, long life, and high power of the LIBs, and has broad application prospects in the field of high energy density LIBs.

In summary, the present invention provides a simple method of nitriding magnesium silicide at a certain temperature to obtain porous Si and magnesium nitride and removing the magnesium nitride by acid pickling so as to obtain ant nest like porous silicon. Meanwhile, ammonia gas produced by etching magnesium nitride process can be recycled. In addition, in the present invention, this method uses commercial Si powder or magnesium silicide as the raw material with features of wide source, low price, easiness to be synthetic, and low toxicity. This method can make sure the large-scale preparation of ant nest like porous Si with low cost, high yield and environmental friendliness, which boosts the commercial implement of the Si-based electrode material for the high performance LIBs. In addition, the obtained micro-sized Si has an ant nest like porous structure and controllable morphology. Therefore, special structural advantages and excellent electrochemical properties ensure ant nest like Si commendable serve in high performance LIBs under the harsh and complex service conditions, promoting micro-sized Si based anode for fast and real practical application of Si anode in LIBs.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention.

According to the present invention, a preparation method of ant nest like porous silicon for a lithium-ion battery comprises: commercially available magnesium silicide (particle size: 1-50 μm) or magnesium silicide (particle size: 1-50 μm) prepared by thermal reaction ($2Mg+Si=Mg_2Si$) of an uniform mixture of silicon powder and an appropriate amount of magnesium powder in an inert atmosphere is ball-milled under the protection of inert gas to prepare particles with a size of 0.2-10 μm, then ant nest like porous silicon with its by-product (magnesium nitride) is obtained by thermal reaction ($3Mg_2Si+4NH_3=3Si+2Mg_3N_2+6H_2$) of the prepared particles in ammonia gas or in a gas mixture of a certain volume ratio of ammonia gas (content: 5-95%) and inert gas (e.g., argon) at 600-900° C., and finally the by-product is removed by acid pickling treatment ($Mg_3N_2+6HCl=3MgCl_2+2NH_3$) to obtain ant nest like porous silicon in high yield.

The invention is described in conjunction with the following embodiments.

Embodiment 1

The embodiment comprises the following steps:

(1) uniformly mixing commercially available silicon particles and magnesium powder in a mass ratio of 1:1.8, and then placing them in a container;

(2) placing the container containing the reactants in a high temperature furnace filled with an inert gas, heating to 400-700° C. at a rate of 5° C./min with a holding time of 6 h so as to obtain magnesium silicide as the product, and taking out the product after being cooled with the furnace to the room temperature;

(3) subjecting the product obtained in the step (2) to ball-milling under the protection of argon and then to screening so as to obtain magnesium silicide particles with a size of 0.2-10 μm;

(4) placing the magnesium silicide particles obtained in the step (3) in a tube furnace in an ammonia gas atmosphere, heating to 600-900° C. with a holding time of 2-24 h, and taking out the product after being cooled with the furnace to the room temperature; and (5) subjecting the product obtained in the step (4) to hydrochloric acid pickling so as to remove magnesium nitride, and then to cleaning, filtration and drying so as to obtain ant nest like porous silicon.

Figure 1:
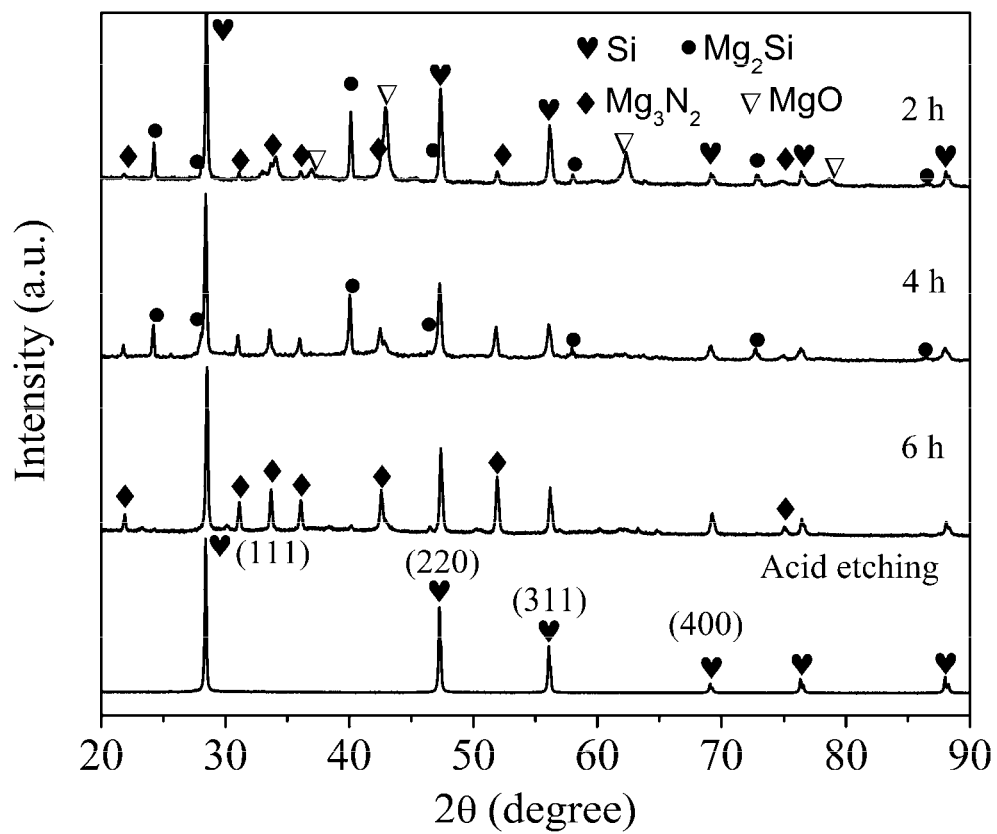
FIG. 1 is a XRD spectrum of ant nest like porous silicon prepared in Embodiment 1 of the present invention.
Figure 2A:
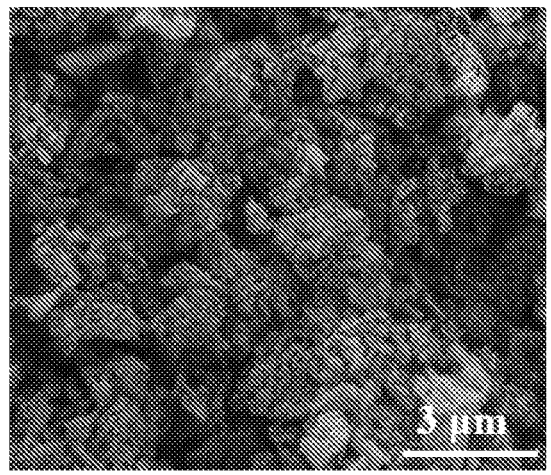
FIGS. 2A and 2B are scanning electron micrographs (SEMs) of the ant nest like porous silicon prepared in Embodiment 1 of the present invention.
Figure 2B:
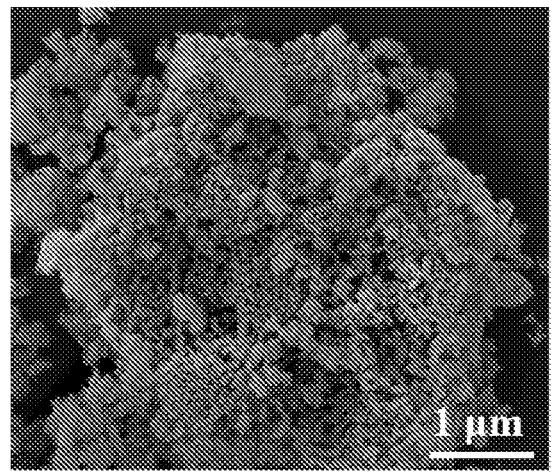
Figure 3:
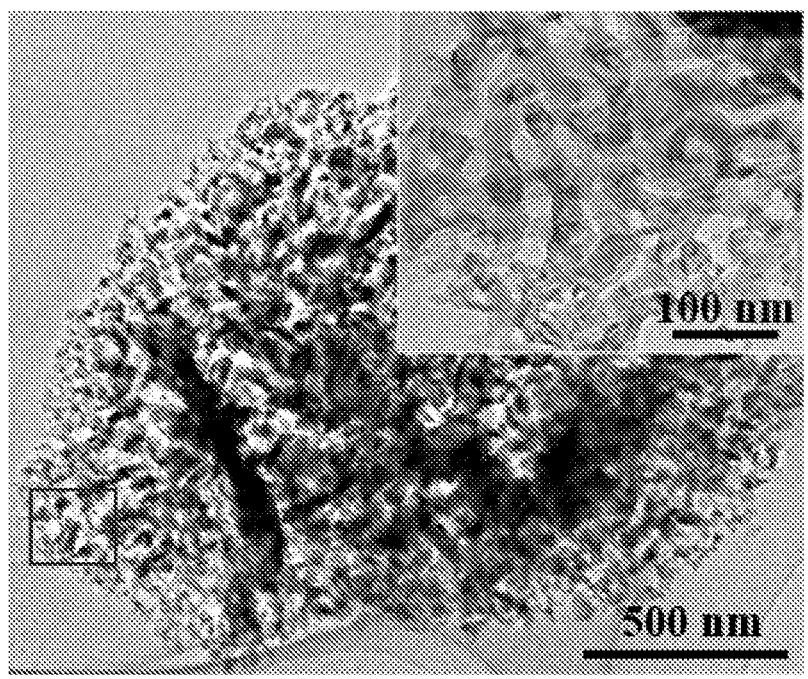
FIG. 3 is a transmission electron microscope (TEM) of the ant nest like porous silicon prepared in Embodiment 1 of the present invention.
Figure 4:
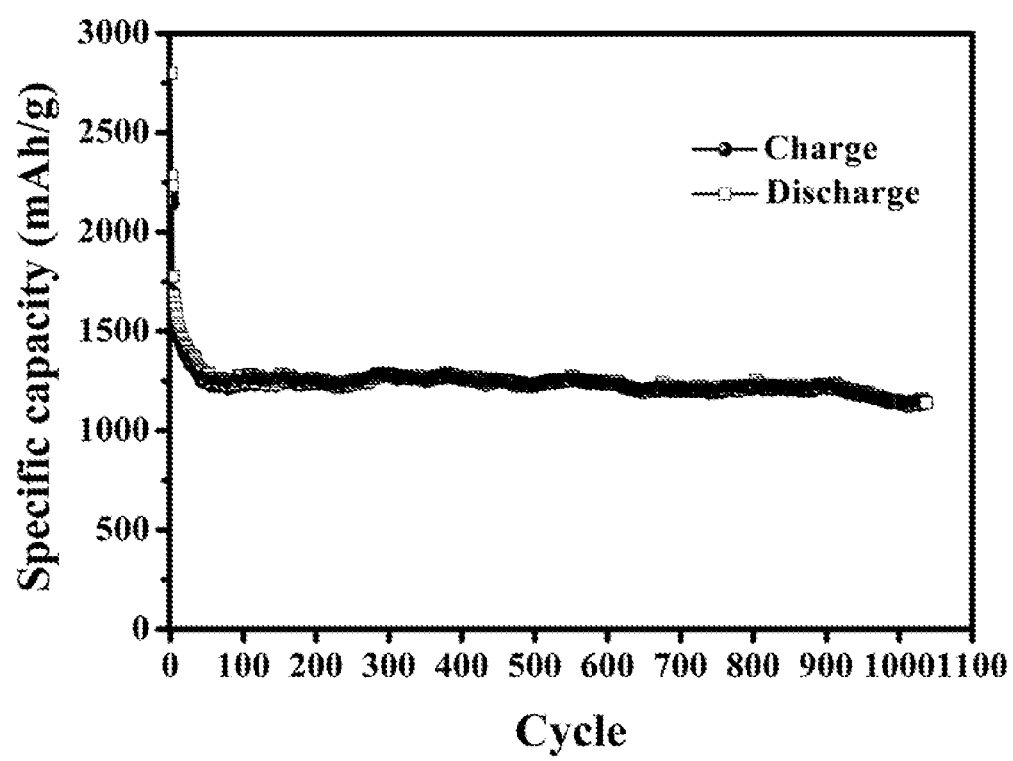
FIG. 4 is a diagram showing the electrochemical cycling performance of the ant nest like porous silicon prepared in Embodiment 1 of the present invention, in which the first coulombic efficiency (CE) is 78.7%.
Figure 5A:
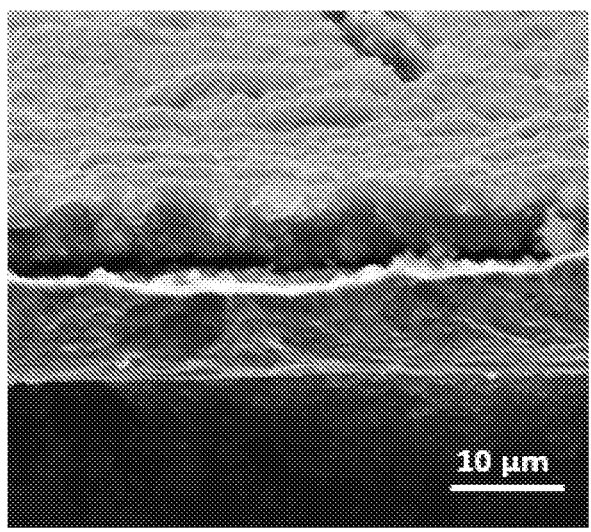
FIGS. 5A and 5B are micrographs of electrode film thicknesses before and after cycling of the ant nest like porous silicon prepared in Embodiment 1 of the present invention, respectively.
Figure 5B:
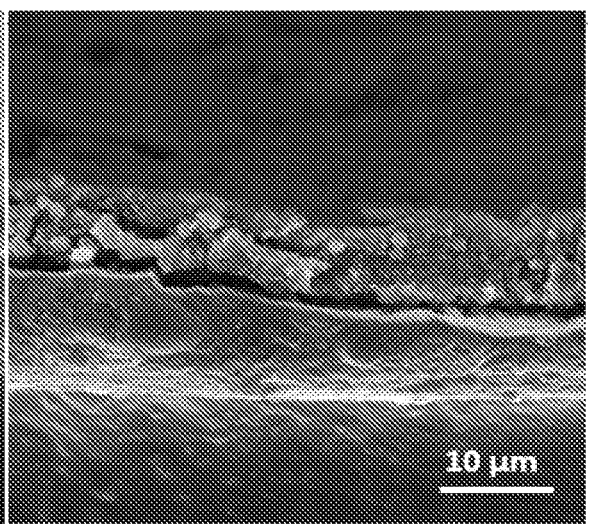

It can be seen from the XRD spectrum of the sample subjected to acid pickling in FIG. 1 that the three strong peaks at 28.4°, 47.3°, and 56.1° correspond to three strong peaks of silicon (JCPDS No. 27-1402), and there are substantially no impurity phase; it can be seen from SEMs in FIG. 2 (including FIGS. 2A and 2B) that the product prepared in this embodiment has a micron-sized porous structure; and it can be seen from TEM in FIG. 3 that three-dimensionally penetrated porous silicon composed of nanocells prepared in this embodiment has a rich pore structure. Thus, the resulting product is micron particles with nanoscale pore structure, and has a tap density of 0.83 g/cm³. FIG. 4 shows the cycling performance of the porous silicon, and after 1000 cycles, the capacity of the porous silicon can reach 1200 mA h/g, showing outstanding cycling stability. FIG. 5 (including FIGS. 5A and 5B) is a comparison diagram of electrode film thicknesses before and after cycling of the ant nest like micron-sized porous silicon prepared in Embodiment 1 of the present invention, and it can be seen that the film thickness does not change much before ((FIG. 5A) and after (FIG. 5B) the cycling, thus greatly reducing battery expansion and improving battery safety. In addition, the product has a specific surface area of 56 m²/g and a compacted density of 1.96 g/cm³.

Embodiment 2

The embodiment comprises the following steps:

(1) uniformly mixing commercially available silicon particles and magnesium powder in a mass ratio of 1:1.9, and then placing them in a container;

(2) placing the container containing the reactants in a high temperature furnace filled with an inert gas, heating to 400° C. at a rate of 3° C./min with a holding time of 12 h so as to obtain magnesium silicide as the product, and taking out the product after being cooled with the furnace to the room temperature;

(3) subjecting the product obtained in the step (2) to ball-milling in a an argon-protected ball mill and then to screening so as to obtain magnesium silicide particles with a size of 1-8 μm;

(4) placing the magnesium silicide particles obtained in the step (3) in a tube furnace in an ammonia gas atmosphere, heating to 650° C. with a holding time of 4 h, and then taking out the product after being cooled with the furnace to the room temperature; and (5) subjecting the product obtained in the step (4) to hydrochloric acid pickling so as to remove magnesium nitride, and then to cleaning, filtration and drying so as to obtain ant nest like porous silicon.

In this way, the obtained ant nest like porous silicon has a specific surface area of 34 m²/g, a tap density of 0.78 g/cm³ and a compacted density of 1.78 g/cm³.

Embodiment 3

The embodiment comprises the following steps:

(1) uniformly mixing commercially available silicon particles and magnesium powder in a mass ratio of 1:2, and then placing them in a container;

(2) placing the container containing the reactants in a high temperature furnace filled with an inert gas, heating to 500° C. at a rate of 10° C./min with a holding time of 10 h so as to obtain magnesium silicide as the product, and taking out the product after being cooled with the furnace to the room temperature;

(3) subjecting the product obtained in the step (2) to ball-milling in a an argon-protected ball mill and then to screening so as to obtain magnesium silicide particles with a size of 0.5-4 μm;

(4) placing the magnesium silicide particles obtained in the step (3) in a tube furnace in an ammonia gas atmosphere, heating to 600° C. with a holding time of 6 h, and then taking out the product after being cooled with the furnace to the room temperature; and (5) subjecting the product obtained in the step (4) to hydrochloric acid pickling so as to remove magnesium nitride, and then to cleaning, filtration and drying so as to obtain ant nest like porous silicon.

In this way, the obtained ant nest like porous silicon has a specific surface area of 46 m²/g, a tap density of 0.77 g/cm³ and a compacted density of 1.81 g/cm³.

Embodiment 4

The embodiment comprises the following steps:

(1) uniformly mixing commercially available silicon particles and magnesium powder in a mass ratio of 1:2.2, and then placing them in a container;

(2) placing the container containing the reactants in a high temperature furnace filled with an inert gas, heating to 600° C. at a rate of 1° C./min with a holding time of 12 h so as to obtain magnesium silicide as the product, and taking out the product after being cooled with the furnace to the room temperature;

(3) subjecting the product obtained in the step (2) to ball-milling in a an argon-protected ball mill and then to screening so as to obtain magnesium silicide particles with a size of 1-5 μm;

(4) placing the magnesium silicide particles obtained in the step (3) in a tube furnace in an ammonia gas atmosphere, heating to 700° C. with a holding time of 12 h, and then taking out the product after being cooled with the furnace to the room temperature; and (5) subjecting the product obtained in the step (4) to hydrochloric acid pickling so as to remove magnesium nitride, and then to cleaning, filtration and drying so as to obtain ant nest like porous silicon.

In this way, the obtained ant nest like porous silicon has a specific surface area of 49 m$^2$/g, a tap density of 0.80 g/cm$^3$ and a compacted density of 1.77 g/cm$^3$.

Embodiment 5

The embodiment comprises the following steps:

(1) uniformly mixing commercially available silicon particles and magnesium powder in a mass ratio of 1:1.9, and then placing them in a container;

(2) placing the container containing the reactants in a high temperature furnace filled with an inert gas, heating to 700° C. at a rate of 5° C./min with a holding time of 6 h so as to obtain magnesium silicide as the product, and taking out the product after being cooled with the furnace to the room temperature;

(3) subjecting the product obtained in the step (2) to ball-milling in a an argon-protected ball mill and then to screening so as to obtain magnesium silicide particles with a size of 0.2-3 μm;

(4) placing the magnesium silicide particles obtained in the step (3) in a tube furnace in an ammonia gas atmosphere, heating to 800° C. with a holding time of 4 h, and then taking out the product after being cooled with the furnace to the room temperature; and (5) subjecting the product obtained in the step (4) to hydrochloric acid pickling so as to remove magnesium nitride, and then to cleaning, filtration and drying so as to obtain ant nest like porous silicon.

In this way, the obtained ant nest like porous silicon has a specific surface area of 51 m$^2$/g, a tap density of 0.81 g/cm$^3$ and a compacted density of 1.92 g/cm$^3$.

Embodiment 6

The embodiment comprises the following steps:

(1) subjecting commercially available magnesium silicide to ball-milling in a an argon-protected ball mill and then to screening so as to obtain magnesium silicide particles with a size of 1-3 μm;

(2) placing the magnesium silicide particles obtained in the step (1) in a tube furnace in an ammonia gas atmosphere, heating to 750° C. with a holding time of 6 h, and then taking out the product after being cooled with the furnace to the room temperature; and (3) subjecting the product obtained in the step (2) to hydrochloric acid pickling so as to remove magnesium nitride, and then to cleaning, filtration and drying so as to obtain ant nest like porous silicon.

In this way, the obtained ant nest like porous silicon has a specific surface area of 56 m$^2$/g, a tap density of 0.84 g/cm$^3$ and a compacted density of 1.94 g/cm$^3$.

Embodiment 7

The embodiment comprises the following steps:

(1) subjecting commercially available magnesium silicide to ball-milling in a an argon-protected ball mill and then to screening so as to obtain magnesium silicide particles with a size of 3-5 μm;

(2) placing the magnesium silicide particles obtained in the step (1) in a tube furnace in a mixed atmosphere of ammonia gas and argon gas (volume fraction of ammonia gas: 50%), heating to 780° C. with a holding time of 6 h, and then taking out the product after being cooled with the furnace to the room temperature; and (3) subjecting the product obtained in the step (2) to hydrochloric acid pickling so as to remove magnesium nitride, and then to cleaning, filtration and drying so as to obtain ant nest like porous silicon.

In this way, the obtained ant nest like porous silicon has a specific surface area of 56 m$^2$/g, a tap density of 0.85 g/cm$^3$ and a compacted density of 1.97 g/cm$^3$.

Embodiment 8

The embodiment comprises the following steps:

(1) subjecting commercially available magnesium silicide to ball-milling in a an argon-protected ball mill and then to screening so as to obtain magnesium silicide particles with a size of 5-8 μm;

(2) placing the magnesium silicide particles obtained in the step (1) in a tube furnace in a mixed atmosphere of ammonia gas and argon gas (volume fraction of ammonia gas: 90%), heating to 850° C. with a holding time of 6 h, and then taking out the product after being cooled with the furnace to the room temperature;

(3) subjecting the product obtained in the step (2) to hydrochloric acid pickling so as to remove magnesium nitride, and then to cleaning, filtration and drying so as to obtain ant nest like porous silicon.

In this way, the obtained ant nest like porous silicon has a specific surface area of 30 m$^2$/g, a tap density of 0.79 g/cm$^3$ and a compacted density of 1.7 g/cm$^3$.

Embodiment 9

The embodiment comprises the following steps:

(1) subjecting commercially available magnesium silicide to ball-milling in a an argon-protected ball mill and then to screening so as to obtain magnesium silicide particles with a size of 0.2-1 μm;

(2) placing the magnesium silicide particles obtained in the step (1) in a tube furnace in a mixed atmosphere of ammonia gas and argon gas (volume fraction of ammonia gas: 70%), heating to 780° C. with a holding time of 6 h, and then taking out the product after being cooled with the furnace to the room temperature;

(3) subjecting the product obtained in the step (2) to hydrochloric acid pickling so as to remove magnesium nitride, and then to cleaning, filtration and drying so as to obtain ant nest like porous silicon.

In this way, the obtained ant nest like porous silicon has a specific surface area of 51 m$^2$/g, a tap density of 0.73 g/cm$^3$ and a compacted density of 1.64 g/cm$^3$.

In the present invention, the commercially available magnesium silicide raw material has a main component of magnesium silicide and may also contain a certain amount of magnesium impurities. In the case of using thermal reaction of silicon powder and magnesium powder to prepare magnesium silicide, the mass ratio of the magnesium raw material may be greater than the corresponding ratio in the ideal reaction equation. For example, the mass ratio of the silicon powder and the magnesium powder may be 1:(1.8-3), so that there is a certain amount of surplus magnesium.

While particular embodiments of the present invention have been shown and described, it will be obvious to those skilled in the art that changes and modifications may be made without departing from the spirit and scope of the present invention.

The present invention claimed is:

1. A preparation method of an ant nest like porous silicon for a lithium-ion battery, comprising:
   (1) conducting a reaction of a magnesium silicide raw material with an ammonia gas or an atmosphere containing ammonia gas for 2-24 h at 600-900° C. to obtain a crude product containing porous silicon and magnesium nitride, wherein the magnesium silicide raw material has a particle size of 0.2-10 μm, wherein the atmosphere containing ammonia gas is a mixed atmosphere of the ammonia gas and a protective gas; and
   (2) subjecting the crude product obtained in the step (1) to an acid pickling treatment to obtain the ant nest like porous silicon for the lithium-ion battery.

2. The preparation method of claim 1,
wherein in the step (1), the reaction has an equation represented by $3Mg_2Si+4NH_3 \rightarrow 3Si+2Mg_3N_2+6H_2$.

3. The preparation method of claim 1,
wherein in the step (1), the magnesium silicide raw material is prepared by a reaction of silicon powder and magnesium powder in an inert atmosphere; the reaction of silicon powder and magnesium powder is carried out at 400-900° C. with a holding time of 1-12 h; and a mass ratio of the silicon powder to the magnesium powder is 1:(1.8-3).

4. The preparation method of claim 1,
wherein in the step (1), a volume fraction of the ammonia gas in the atmosphere containing ammonia gas is 5-95%; and the protective gas is an inert gas.

5. The preparation method of claim 1,
wherein in the step (1), the magnesium silicide raw material is ball-milled via a ball milling treatment so that the magnesium silicide raw material has the particle size of 0.2-10 μm; and the ball milling treatment is carried out under a protection of an inert gas.

6. The preparation method of claim 1,
wherein in the step (2), the acid pickling treatment is carried out by hydrochloric acid pickling to remove magnesium nitride which is a reaction by-product in the crude product obtained in the step (1); the ammonia gas generated in the acid pickling treatment is collected and used for participating in the reaction of the magnesium silicide raw material in the step (1); and magnesium salt generated in the acid pickling treatment is used for preparing magnesium powder.

7. The preparation method of claim 1,
wherein the ant nest like porous silicon obtained in the step (2) has a specific surface area of 30-56 $m^2/g$, a tap density of 0.77-0.85 $g/cm^3$, and a compacted density of 1.64-1.97 $g/cm^3$.

* * * * *